UNITED STATES PATENT OFFICE 1,944,599

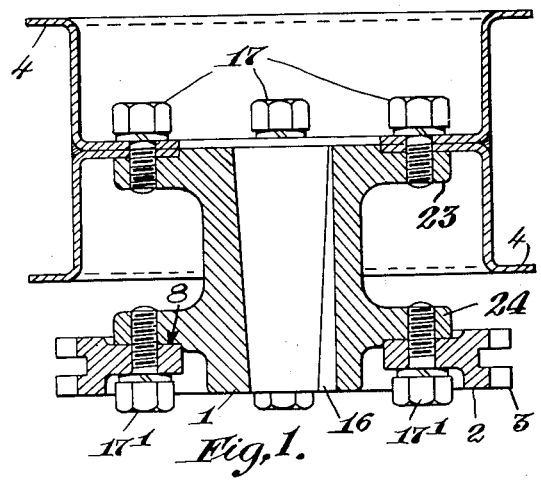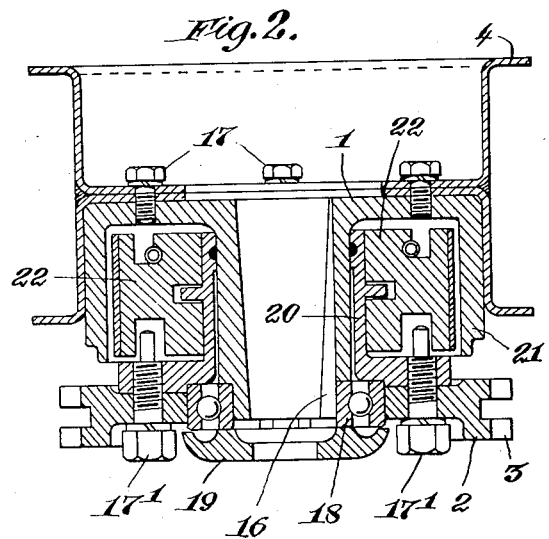

DRIVING OF AUXILIARY APPARATUS ON RAILWAY VEHICLES

John Gordon, Winnepeg, Manitoba, Canada, assignor to J. Stone & Company Limited, Deptford, England, a company of Great Britain Application December 27, 1932, Serial No. 649,059, and in Great Britain January 1, 1932

2 Claims. (Cl. 74—31)

This invention concerns improvements relating to transmission gear for the driving of auxiliary apparatus on railway vehicles from the axles thereof.

There are various kinds of transmission gear in use whereby such auxiliary apparatus as dynamos, compressors and the like is driven from the axles of vehicles. In some railway systems a belt transmission is employed and in some others a chain transmission. Furthermore in certain systems these two kinds of transmission may be in use at the same time and it may be essential from a standardization point of view that all axles and fitments thereto should be interchangeable and suitable for any coach. In some systems it might even be desirable, moreover, to change over from one kind of transmission to the other to meet certain seasonal conditions, such as severe winter conditions under which the use of a belt may be regarded as impracticable. The principal object of the invention is to provide a combined belt-pulley and chain-wheel to meet circumstances such as these, so that a belt can be employed without interference by the chain-wheel teeth and, alternatively, a chain without interference by the pulley rims. A further object is to provide an arrangement whereby the chain, when used, is protected against the effects of the shocks and sudden strains occasioned for example in railway working.

Embodiments of the invention are illustrated by way of example in the accompanying drawing, in which Figures 1 and 2 are longitudinal sections of preferred forms of the invention.

Figure 1 illustrates an arrangement as employed on the shaft of the auxiliary apparatus. Naturally a similar, appropriately modified arrangement may be employed on the vehicle axle also. The combined pulley and chain wheel comprises a hollow cylindrical flanged hub-body 1, a sprocket wheel consisting of a ring 2 having twin chain teeth 3 cut therein and a pair of flanged pulley rims 4. The ring 2 and the pulley rims 4 are respectively secured to end flanges 24 and 23 of the hub-body 1 by screws 17', 17, the flange 24 being rebated at 8 to receive the ring 2. The sprocket teeth 3 are thus located beside the pulley rims 4 so that when a chain drive is employed the chain does not foul the pulley. The hub-body 1 is suitably secured to the shaft or axle, to which it is applied, by means of a key engaging a key-way 16 in the said hub-body.

Figure 2 illustrates a refinement of this arrangement. In this case only the pulley 4 is fixedly secured to the hub-body 1. The sprocket wheel 2, on the other hand, is carried freely by a ball-bearing 18 securable to the hub-body 1 by a cap member 19. Secured to the sprocket wheel 2 by the screws 17' is a flanged bushing 20 which is spaced from the hub body 1 over the greater part of its length but is guided and is a running fit thereon at its inner end. The hub body 1 is formed with a shell or drum portion 21 which embraces an annular space around the bushing 20, said bushing and said drum portion constituting the driving and driven elements of a centrifugal clutch whereof the centrifugal elements 22 are disposed in the aforesaid annular space. It is not proposed to describe the centrifugal clutch in detail as the preferred form illustrated is fully described in the specifications of U. S. Patent No. 1,857,020 and U. S. patent application No. 571,850.

When using the chain drive, the provision of the centrifugal clutch ensures that the chain is not subjected to undue shocks and sudden strains. As a train commences to move, for example, the centrifugal elements, at a predetermined train-speed, engage the drum 21 initially with a certain amount of slip so that the load of the auxiliary apparatus is not thrown suddenly on the chain. In the case of the belt drive being used, there is naturally not the same danger of damage due to sudden shocks, as the belt can in any case slip on the pulleys.

With the arrangements described it will be seen that there is no obstacle to an immediate change from belt-drive to chain-drive or vice versa, it being unnecessary, moreover, to maintain a stock of two different sets of wheel components. Naturally in some cases adjustments extraneous to the drive itself may have to be made, for example dynamo-suspension adjustments, but the ample necessary provisions for these will be obvious to those skilled in the art and are outside the scope of the present invention.

I claim:—

1. A combined belt-pulley and chain-wheel, comprising a hollow, cylindrical hub-body, a radial flange at one end of said hub-body, a belt-pulley mounted on said flange so as to surround said hub-body, a ring of chain-teeth mounted so as to be free to rotate on said hub-body at a distance axially from said belt-pulley, and a centrifugal clutch device disposed between said ring of teeth and said hub-body and adapted to operatively couple them at a predetermined speed of rotation of the ring of teeth.

2. A combined belt-pulley and chain-wheel, comprising a hollow, cylindrical hub-body, a radial flange at one end of said hub-body, a belt-pulley mounted on said flange so as to surround said hub-body, a ring of chain-teeth, a bearing for said ring of chain-teeth at the other end of said hub-body and beyond the outer side of said pulley, a bushing extending within the pulley connected to said ring and rotatable about said hub-body, a drum member on the flange of said hub-body arranged to form an annular space, and centrifugal clutch members disposed in the annular space and rotatable with the bushing in said space, said clutch members being engageable with the drum at a predetermined speed of rotation of the ring.

JOHN GORDON.